United States Patent [19]

Goudy

[11] Patent Number: 4,505,314
[45] Date of Patent: Mar. 19, 1985

[54] WHEEL WITH TIRE BEAD LOCKING RING

[76] Inventor: Richard A. Goudy, 101 W. Spring St., Long Beach, Calif. 90806

[21] Appl. No.: 482,850

[22] Filed: Apr. 7, 1983

[51] Int. Cl.³ .................. B60B 25/12; B60B 25/20
[52] U.S. Cl. .................. 152/398; 301/35 R; 301/63 D; 411/183
[58] Field of Search .............. 411/172, 173, 176, 177, 411/183; 301/35 R, 63 D; 152/397, 398, 330 RF

[56] References Cited

U.S. PATENT DOCUMENTS

| 1,344,456 | 6/1920 | Schroeder | 411/177 X |
| 2,576,736 | 11/1951 | Watkins | 152/397 |
| 3,283,800 | 11/1966 | Ischinger et al. | 152/397 |

FOREIGN PATENT DOCUMENTS

| 210930 | 3/1956 | Australia | 152/397 |
| 1259338 | 5/1961 | France | 152/398 |
| 670048 | 10/1964 | Italy | 411/173 |
| 1545790 | 5/1979 | United Kingdom | 152/398 |

OTHER PUBLICATIONS

Center Line-Racing Wheels: *Petersen's Circle Track;* Daytona Race Fan Guide, Feb. 1983.

Primary Examiner—David A. Scherbel
Attorney, Agent, or Firm—David O'Reilly

[57] ABSTRACT

A wheel for mounting tubeless tires in which the bead of the tire is sealed and clamped on one or both sides of the wheel. The bead is sealed and clamped by a bead locking ring having a peripheral lip on an axially parallel surface of revolution, terminating in an annulus which mates with a similar surface of revolution formed on one or both ends of the wheel having a matching annulus to which the ring is securely bolted. The annulus on the wheel is provided with a plurality of blind threaded inserts for receiving bolts which pass through the ring, securely clamping the bead between a peripheral lip on the wheel and the lip on the bead locking ring. The locking ring is formed so that the mutual surfaces of revolution on the locking ring and the wheel respectively provide lightweight, reinforced stiffening of the locking ring (i.e. in-plane strength), preventing bending and warping when bolted to the wheel.

6 Claims, 5 Drawing Figures

WHEEL WITH TIRE BEAD LOCKING RING

FIELD OF THE INVENTION

This invention relates to wheels for tubeless tires and more particularly relates to wheels having bead locking compression rings.

BACKGROUND OF THE INVENTION

Conventional wheels for mounting tubeless tires have a hub formed with peripheral flanges for abutting and sealing the beads on each side of the tubeless type tires. A frequent problem with these wheels is that when cornering, the centrifugal load on the tire can cause a separation of the bead from the rim, resulting in loss of air. This deflates the tire, requiring reinflation of the tire at frequent intervals. There is also the danger always present that underinflation can cause loss of steering control.

When a tubeless tire is used on high performance (high speed, heavy duty) vehicles, to the above problem is added the additional problem that at high speeds centrifugal forces on the tire can cause the tire bead to separate from the rim, which can cause the tire to completely separate from the wheel. This exposes the race car driver to the serious danger of losing control and crashing. However, in addition it is an extreme disadvantage because in order to remain within safe limits as defined by the wheel and tire, the driver must limit his speed when cornering and may therefore lose advantage in a race. It would be to the driver's advantage to have his limitations dictated other than by his wheels and tire mounting, and be able to operate his vehicle at maximum performance limited only by his engine parameters, for example, rather than by his wheels.

There are wheels which provide means to clamp the beads of a tire. These wheels, however, provide a flange on the hub which cooperates with a flange on a ring to apply axial forces on either side of the bead. These rings are generally of planar construction, are heavy in weight and do not provide much clamping strength and because of their weight and location, add undesirable unsprung weight. They are also quite complicated in design, sometimes requiring specially constructed tire beads to achieve the clamping effect.

It is an object of the present invention to provide a wheel having means for more securely holding a tubeless tire on the wheel.

Another object of the present invention is to provide an improved tire mounting system in which the wheel and tubeless tire sealing system in combination have means for applying a clamping force to hold the bead securely, which contributes minimized unsprung weight to the system.

Still another object of the present invention is to provide a tire mounting system which securely clamps the bead of a tire, yet is safe and easy to use.

Still another object of the present invention is to provide a tire mounting system having a bead locking compression ring which has great in-plane strength with overall weight minimized.

BRIEF DESCRIPTION OF THE INVENTION

The purpose of the present invention is to provide a wheel for mounting a tubeless tire, having compression ring means for securely compression locking the tire bead to the wheel to prevent separation of the bead and loss of air.

The wheel is provided with a hub with a central axis and a bead locking compression ring adapted to mount on said hub to clamp and lock the bead of a tire between the ring means and the hub. The ring has an axially parallel surface of revolution which mates in a close tolerance fit with a similar surface of revolution formed on one side of the hub. The axially parallel surfaces of revolution on the hub and locking ring each have a peripheral lip for abutting the inside and outside surfaces of a tire bead. Further, the hub and ring-like means each have an annulus which mate to provide a mounting surface for the compression ring means. This construction maximizes clamping force and in-plane strength to prevent warping, twisting, etc. while minimizing weight. This effectively reduces unsprung weight of the entire tire mounting system.

A plurality of threaded sockets are provided by installing blind socket inserts in holes in the annulus and tightly securing them by swaging. Matching holes in the annulus on the compression ring match the socket inserts. A tire is positioned on the hub with a peripheral lip on the hub abutting the inside surface of the bead. The ring then fits in and passes beyond the bead with the respective surfaces of revolution internesting in a close tolerance fit and a peripheral lip on the ring abutting to outside surface of the bead. Bolts are passed through the ring into the threaded sockets and tightened down, securely locking the bead between the respective peripheral lips. Additionally, the surface of revolution on the ring may be provided with an increasing diameter larger than the diameter of the bead, to provide a sealingly deformable radial force on the toe of the bead in the same manner as the usual tubeless tire seal to complement the clamping effect of the two peripheral lips. A tire is easy to mount with the system described because the compression ring slips into and passes beyond the bead. The mounting is then easily completed by threading a few bolts into the socket inserts. The compression ring will therefore not easily slip out and no special tools to hold the ring in place or expand the tire are needed.

With a tubeless tire mounted by the compression ring tire mounting system according to the invention, the tire cannot be easily twisted off the wheel. The tire mounting system is also safer than conventional tubeless tires as the tire will not easily separate, even if the tire is accidentally overinflated. Further, bead locking compression rings can be provided on one or both sides of a wheel, as desired. The tire mounting system is not only functionally efficient, but is also aesthetically attractive because the mounting bolts are recessed beyond the tire bead and not exposed.

The above and other features of the invention will be fully understood from the following detailed description and the accompanying drawings in which:

DETAILED DESCRIPTION OF THE PREFERRED EMBODIMENT

Figure 1:
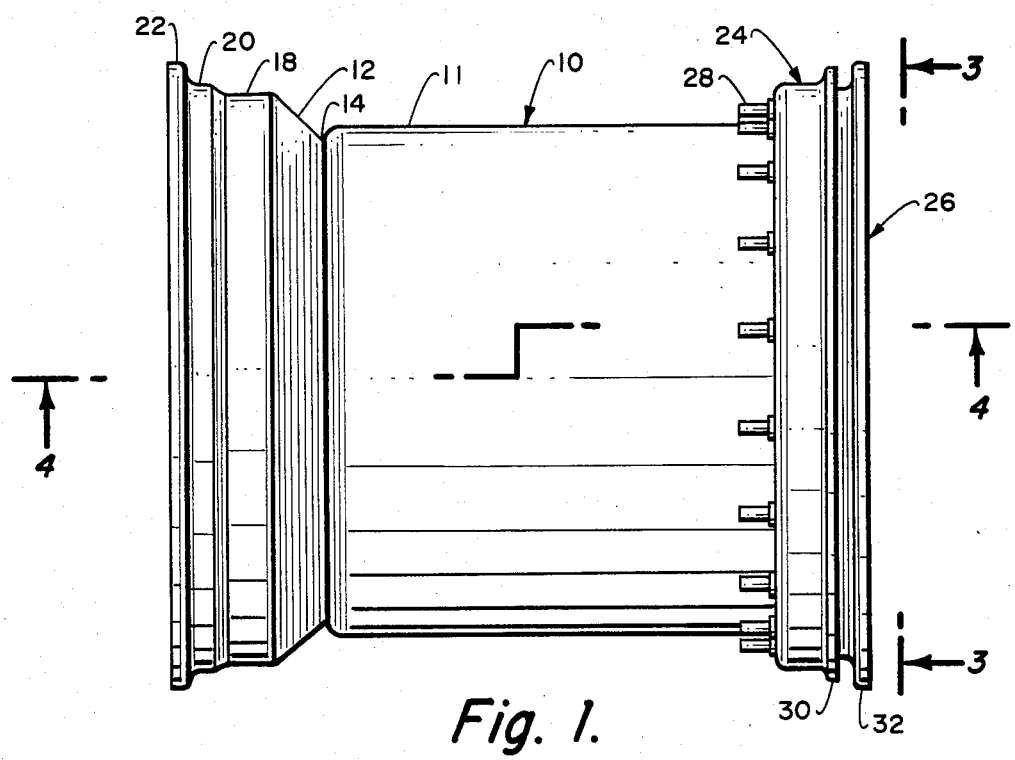
FIG. 1 is an end view of a wheel constructed according to the invention.
Figure 4:
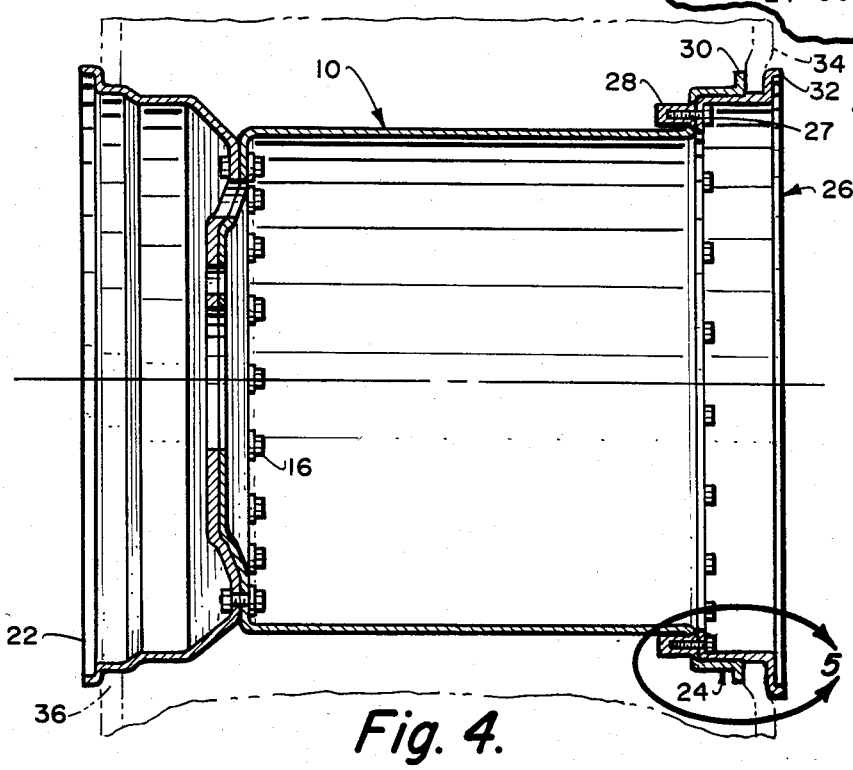
FIG. 4 is a sectional view taken at 4—4 of FIG. 1.

A wheel constructed according to the invention is illustrated in FIG. 1 and is comprised of two halves bolted together at the center portion or spider. The wheel is comprised of a hub 10 having an outer half 11 and an inner half 12 joined at the center webs or spider 14 by a plurality of bolts 16 (FIG. 4). The inner half 12 flairs outward, as in a conventional tubeless tire wheel, to a larger circumference 18 terminating in a raised shoulder 20 having a lip 22. The diameter of shoulder 20 is larger than the diameter of the tire bead and expands and seals the toe of a bead seated against peripheral lip 22.

The outer half of the wheel 11 terminates in a flange 24 constructed to mate with a bead locking compression ring. The bead locking compression ring 26 nests with the flange 24 and is secured by a plurality of bolts 27 engaging in blind socket inserts 28 as will be described in greater detail hereinafter. The flange 24 and bead locking compression ring 26 have opposing peripheral lips 30 and 32 for clamping and locking the bead of a tire to the wheel.

The bead locking compression ring 26 has a surface of revolution 40 substantially parallel to the axis of hub 10 terminating in a radial annulus 41. Flange 24 on hub 10 has a similar surface of revolution 42 and annulus 43. The inner diameter of the surface of revolution 42 is a close tolerance fit to the outer diameter of the surface of revolution 40 so that when the ring 26 is internested with flange 24, the two surfaces of revolution reinforce one another, providing tremendous strength for clamping and locking the bead 38 between peripheral lips 30 and 32. Bead locking compression ring 26 thus can be made to have great in-plane strength for clamping the bead while at the same time being relatively light in weight. This construction not only reduces unsprung weight of the wheel, but also provides in-plane stiffness for the lip 32 around the peripheral edge of the ring. Additionally, the surface of revolution 40 is larger in diameter than the bead of the tire and may include a shoulder 40' which provides a radial expanding seal against the toe of the tubeless tire, similar to the conventional tubeless tire. Further bolts 27 securing the locking ring are well beyond the tire bead, completely unexposed. The locking ring and hub design described produce a much lighter in weight and stiffer structure than any heretofore known tire clamping device. Further, no special constructed tires or tire beads are needed.

Figure 5:
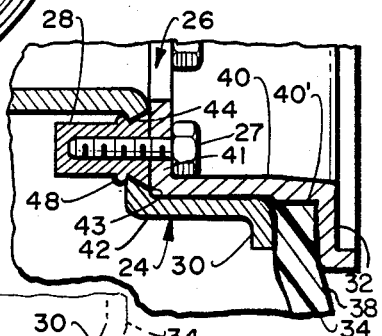
FIG. 5 is an enlarged partial section of the area circled at 5 of FIG. 4.

As can be seen in the enlarged partial section of FIG. 5, blind socket inserts 28 are mounted in countersunk holes 44 on a radially inwardly extending annulus 43 on flange 24. The rear portion of the threaded inserts are swaged tightly at 48 against the rear of annulus 43, sealing countersunk holes 44. The number of threaded inserts provided depends on the size and type of wheel.

The mounting of a tire is illustrated in FIG. 4 and the detail enlarged section of FIG. 5. The tire 34 is mounted on the wheel with one of the beads 36 sealed against the peripheral lip 22. The opposite side of the tire is clamped between flange 24 and bead locking ring 26. The bead 38 (FIG. 5) is positioned between peripheral lips 30 and 32 on flange 24 and bead locking ring 26. Bolts 27 are threaded into threaded socket inserts 28 and tightened down until the lip 32 compresses and locks bead 38 against lip 30 on flange 24. The number of bolts used depends on the size of the wheel but the number should provide a safety factor with four to one as a minimum (i.e. four times as many as needed).

Figure 2:
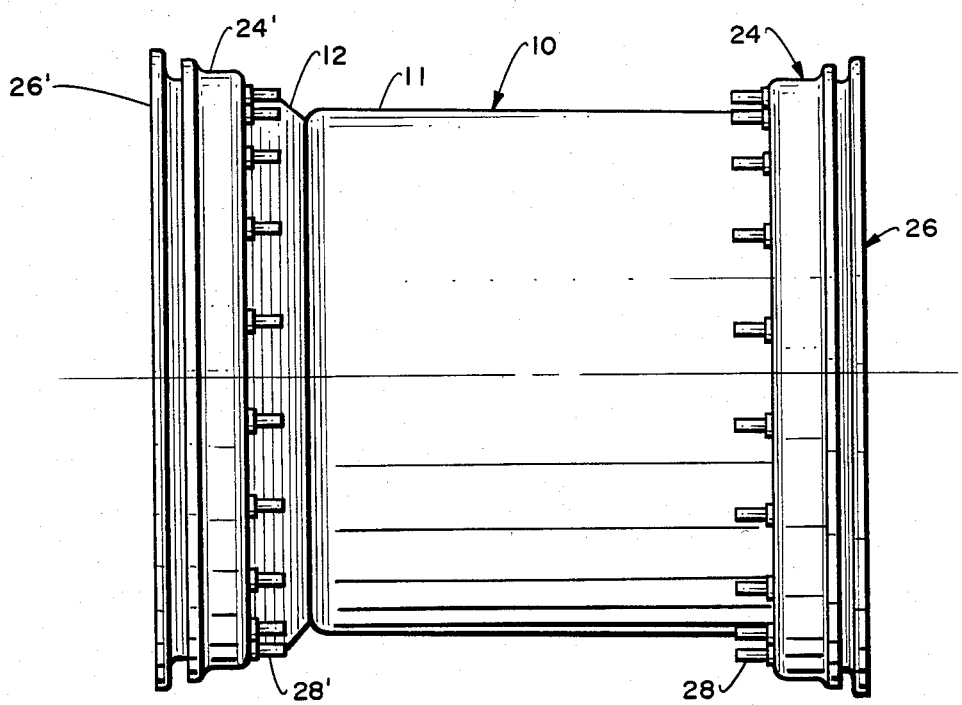
FIG. 2 is an end view showing an alternate construction of a wheel according to the invention.
Figure 3:
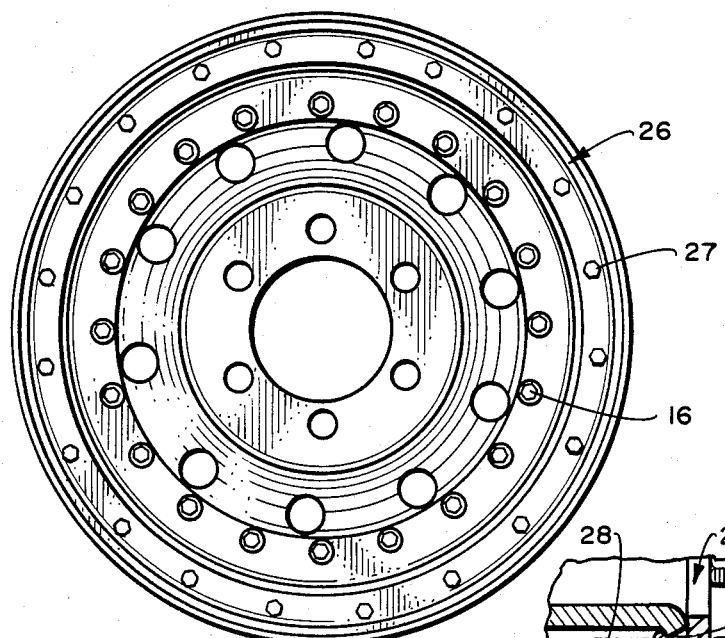
FIG. 3 is a side view of the wheel.

An alternate embodiment is illustrated in FIG. 2. In this embodiment the outer half of the wheel rim 11 has flange 24 for receiving the internesting locking rings 26 as before. The locking ring is fastened by bolts engaging blind inserts 28. In addition, the opposite side or inner half of wheel rim 12 has a flange 24' for receiving a second locking ring 26' substantially identical with the first. The second locking ring 26' is also mounted by means of blind inserts 28' in a manner substantially identical with the mounting on the opposite side of the wheel. In the alternate configuration illustrated in FIG. 2, the tire will then have both beads mounted and sealed by the locking compression ring and also securely clamped between locking rings 26 and 26', assuring a tight seal and strong mounting of a tire at both the inner and outer sides.

Thus, there has been described a new and unique wheel for mounting tires which prevents tubeless tires from being easily twisted off the rim at high speeds in turns and effectively prevents leaks around the sealed portion of the rim. The wheel can be made with locking compression rings on one or both sides as desired.

Obbviously, many modifications and variations of the invention are possible in light of the above teachings. It is therefore to be understood that the full scope of the invention is not limited to the details disclosed herein but only by the claims appended hereto and may be practiced otherwise than as specifically described.

What is claimed is:

1. A wheel for mounting a tubeless tire having two sidewalls and a pair of beads possessing the property of limited deformability to conform to a rigid surface that makes a sealing contact with them, said wheel comprising: a hub having a central axis; bead locking ring means mounted on at least one end of said hub means, said bead locking ring means having a flange with a peripheral lip, a radial annulus and a surface of revolution parallel to said axis constructed to receive and extend beyond said bead, said surface of revolution constructed to seal said bead when said bead abuts said lip; a flange on at least one end of said hub having a peripheral lip and a surface of revolution parallel to said axis terminating in a radial annulus substantially identical to the surface of revolution a radial annulus on said bead locking ring means to that said bead locking ring means and said flange on said hub mate in a close tolerance fit with and reinforce the surface of revolution and radial annulus on said bead locking ring means; mounting means mounting said bead locking ring means with said bead clamped between the peripheral lips on said flange and said bead locking ring means whereby said tire is sealingly mounted and securely clamped to said wheel.

2. The wheel according to claim 1 in which said mounting means comprises: a plurality of means fastened to the radial annulus on said hub; a plurality of bolt means securing said radial annulus of said bead locking ring means to said plurality of threaded insert means.

3. The wheel according to claim 2 in which said threaded insert means comprises a plurality of equally spaced blind inserts securely attached around said radial annulus on said hub; said bolts being threaded into said blind inserts to draw said radial annulus of said bead locking ring means toward said hub to clamp said bead.

4. The wheel according to claim 2 in which said axially parallel surface of revolution has a diameter slightly larger than the diameter of said tire mounting bead whereby a radially deforming force is applied to said bead as said ring is tightened down on said hub to seal said bead.

5. The wheel according to claim 1 in which there are a pair of said bead locking ring means mounted on opposite ends of said hub.

6. In a wheel having a hub with a central axis and peripheral flanges for abutting and sealing beads on each side of a tubeless tire mounted on said wheel, the improvement comprising: at least one of said flanges being on a bead locking ring means formed with a surface revolution and a radial annulus; said surface of revolution being parallel to said axis and extending beyond said bead when mounted and having a diameter which seals said bead; at least one end of said hub having a peripheral flange with a surface of revolution and a radial annulus substantially identical in construction with said surface of revolution and radial annulus on said bead locking ring means so that said bead locking ring means and said flange on said hub mate in a close tolerance fit with and reinforce said surface of revolution and radial annulus on said bead locking ring means with said bead clamped between said flanges; mounting means for mounting said bead locking ring on said hub.

* * * * *